United States Patent
Morrison et al.

(10) Patent No.: US 9,881,304 B2
(45) Date of Patent: Jan. 30, 2018

(54) RISK-BASED CONTROL OF APPLICATION INTERFACE TRANSACTIONS

(71) Applicant: CA, Inc., Islandia, NY (US)

(72) Inventors: Kenneth William Scott Morrison, New Westminster (CA); Thomas E. Hamilton, III, Sudbury, MA (US); James D. Reno, Scotts Valley, CA (US)

(73) Assignee: CA, Inc., Islandia, NY (US)

( * ) Notice: Subject to any disclaimer, the term of this patent is extended or adjusted under 35 U.S.C. 154(b) by 324 days.

(21) Appl. No.: 14/163,750

(22) Filed: Jan. 24, 2014

(65) Prior Publication Data

US 2015/0213449 A1    Jul. 30, 2015

(51) Int. Cl.
  *G06Q 20/00*     (2012.01)
  *G06Q 20/40*     (2012.01)

(52) U.S. Cl.
  CPC .............................. *G06Q 20/4016* (2013.01)

(58) Field of Classification Search
  None
  See application file for complete search history.

(56) References Cited

U.S. PATENT DOCUMENTS

| | | | | |
|---|---|---|---|---|
| 7,707,618 B1* | 4/2010 | Cox | ................. | G06F 17/30067 726/1 |
| 8,275,636 B2* | 9/2012 | Berg | ..................... | G06Q 40/08 705/38 |
| 8,438,382 B2* | 5/2013 | Ferg | ........................ | H04L 9/321 380/255 |
| 8,527,418 B2* | 9/2013 | Enzaldo | ................. | G06Q 40/02 705/35 |
| 2008/0189788 A1* | 8/2008 | Bahl | ..................... | G06F 21/577 726/25 |
| 2010/0031358 A1* | 2/2010 | Elovici | ............... | H04L 12/2602 726/24 |

* cited by examiner

*Primary Examiner* — Scott S Trotter
(74) *Attorney, Agent, or Firm* — Sage Patent Group

(57) ABSTRACT

An API transaction risk assessment equipment is disclosed that receives an API transaction request through a data network from an application processed by a source node, and generates a risk assessment score based on context information that characterizes the API transaction request. The risk assessment score indicates a level of trustworthiness of the API transaction request for processing by an application on a destination node. The API transaction risk assessment equipment then controls deliverability of the API transaction request through the data network to the destination node for processing based on the risk assessment score. Corresponding methods by API transaction risk assessment equipment are disclosed.

16 Claims, 4 Drawing Sheets

US 9,881,304 B2

RISK-BASED CONTROL OF APPLICATION INTERFACE TRANSACTIONS

TECHNICAL FIELD

The present invention relates generally to a networked system of computer nodes and, more particularly, to the management of application interface transactions through applications on computer nodes.

BACKGROUND

Attacks carried out through the Internet against computer applications and equipment are increasing in frequency and sophistication. Tools are presently available to detect and defend against attacks that are carried out through the Internet against HTML interface web applications. However, these tools are strictly targeted at those specific types of attacks. This results in many other types of computer systems, such as computer systems hosting cloud services, remaining vulnerable to attack although they may have a much greater consequential harm if compromised.

SUMMARY

Some embodiments disclosed herein are directed to application interface (API) transaction risk assessment equipment that receives an API transaction request through a data network from an application processed by a source node, and generates a risk assessment score based on context information that characterizes the API transaction request. The risk assessment score indicates a level of trustworthiness of the API transaction request for processing by an application on a destination node. The API transaction risk assessment equipment then controls deliverability of the API transaction request through the data network to the destination node for processing based on the risk assessment score.

In some further embodiments, the API transaction risk assessment equipment selectively forwards or discards the API transaction request based on the risk assessment score, modifies content of the API transaction request based on the risk assessment score, communicates an authentication challenge message to the source node based on the risk assessment score, and/or other defined operations disclosed herein. The API transaction risk assessment equipment can generate the risk assessment score based on whether an API transaction protocol that is being used by the API transaction request matches an API transaction protocol that is expected to be used by the application processed by the source node, whether the source node has a network address that is within a list of network addresses of source nodes that are known to be sources of untrustworthy API transaction requests, whether a routing address pathway includes a network address that is within a list of known network addresses of anonymizing servers, and/or other defined rules disclosed herein.

Some other embodiments are directed to corresponding methods by API transaction risk assessment equipment.

It is noted that aspects described with respect to one embodiment may be incorporated in different embodiments although not specifically described relative thereto. That is, all embodiments and/or features of any embodiments can be combined in any way and/or combination. Moreover, computer equipment, systems, methods, and/or computer program products according to embodiments will be or become apparent to one with skill in the art upon review of the following drawings and detailed description. It is intended that all such additional computer equipment, systems, methods, and/or computer program products be included within this description and protected by the accompanying claims.

BRIEF DESCRIPTION OF THE DRAWINGS

Aspects of the present disclosure are illustrated by way of example and are not limited by the accompanying drawings. In the drawings.

DETAILED DESCRIPTION

Various embodiments will be described more fully hereinafter with reference to the accompanying drawings. Other embodiments may take many different forms and should not be construed as limited to the embodiments set forth herein. Like numbers refer to like elements throughout.

Some embodiments are directed to reducing security risks associated with the processing of application programming interface (API) transaction requests that are received through APIs of applications on computer equipment, such as applications providing application-to-application Web services or other API application endpoints. Some embodiments disclosed herein provide API transaction risk assessment equipment that can detect explicit threats on a transaction-by-transaction basis by scanning content of API transactions for known attack signatures. Moreover, the equipment may detect more sophisticated attacks by analyzing API transactions spanning all or part of an entire transaction sequence from an application on a source node (e.g., client computer) and a destination node (e.g., application server).

As used herein, an "API transaction" can be any interaction occurring between two or more software applications that may be performed using a defined operational routine, data structure, object classes, and/or variable. For example, SOAP and REST service transactions can be performed using a defined API library of remote calls.

Figure 1:
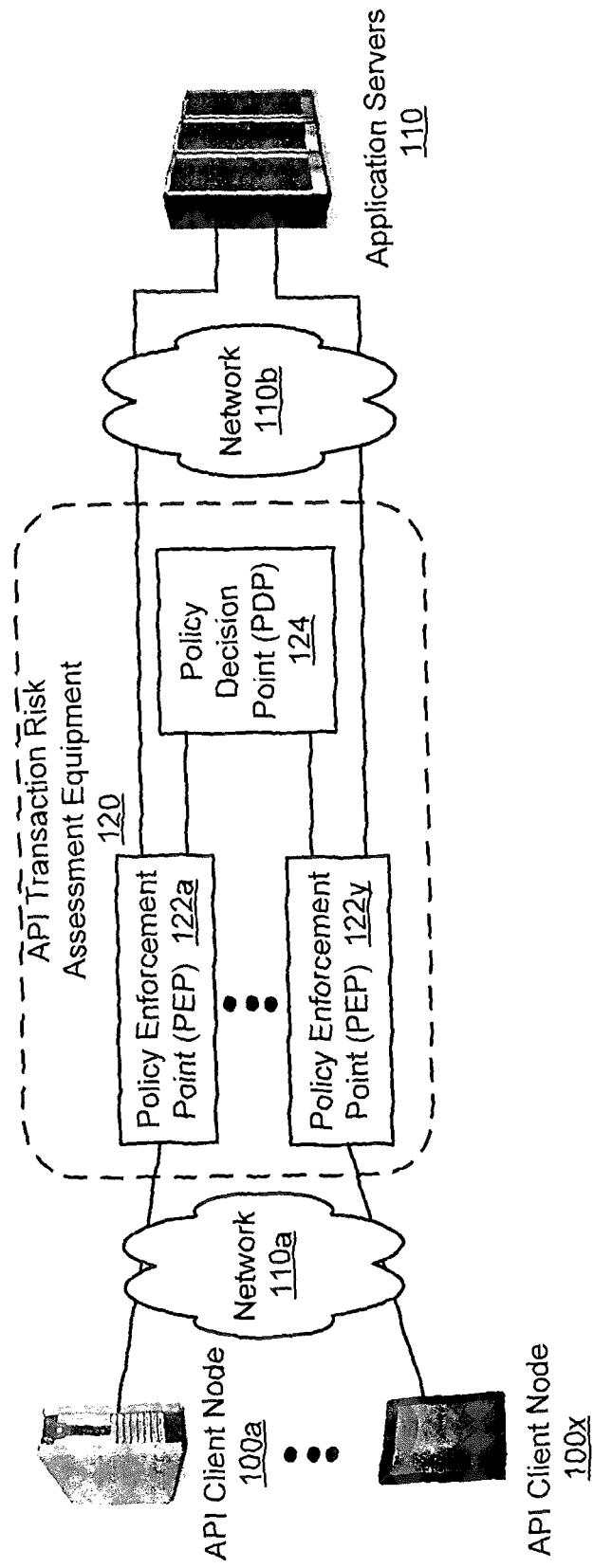
FIG. 1 is a block diagram of a computer system that includes API transaction risk assessment equipment that intercepts and controls deliverability of API transaction requests from API client nodes to application servers, in accordance with some embodiments.

FIG. 1 is a block diagram of an embodiments of a computer system that includes API transaction risk assessment equipment 120 that intercepts and controls deliverability of API transaction requests from API client nodes 100a-100x to application servers 110 for processing.

Referring to FIG. 1, The API transaction risk assessment equipment 120 receives API transaction requests (e.g., Web API service calls, RESTful API transactions, etc.) through one or more data networks 110a from applications processed by one or more API client nodes 100a-100x. The API transaction risk assessment equipment 120 can operate on each of the API transaction requests to generate a risk assessment score based on context information that characterizes the API transaction request. The risk assessment score indicates a level of trustworthiness of the API transaction request for processing by an application on the application servers 110. The API transaction risk assessment equipment 120 can control deliverability of the API transaction request through one or more data networks 110b to the application servers 110 for processing based on the risk assessment score.

Because the risk assessment is performed by the API transaction risk assessment equipment 120 and, may be performed before the API transaction request reaches the destination node 110 for processing by an application on the application severs 110, the application can be protected from potential damage and the amount of checking can be reduced that is needed by the application or another component of the application servers 110 to obtain a desired level of security.

As will be explained in further detail below, the risk assessment score can be generated by evaluating contextual elements of the transaction using defined risk assessment rules. In one embodiment, a risk assessment score of zero indicates a lowest potential risk of the API transaction causing undesired operation when processed by the application servers 110, while in contrast a risk assessment score of 100 indicates a highest potential risk of the API transaction causing such undesired operation. Various types of undesirable operations that an API transaction may be assessed for as possibly causing risks can include, but are not limited to, attempting to obtain information from application servers 110 for delivery to a falsely identified API client application, attempting to obtain information from the application servers 110 that is not authorized by access privileges of an API client application, attempting to improperly modify operation of one or more applications on the application servers 110, and/or attempting to improperly utilize resources of the application servers 110 (e.g., access resources that are not authorized for use by the API client application).

The source nodes (e.g., API client nodes 100a-100x) can be any type of computer equipment that processes applications to generate API transactions requests, such as Web API service calls, RESTful API transactions, etc., and may include, but are not limited to desktop computers, laptop computers, tablet computers, smart phones, application servers, and mainframe computers. The destination nodes may correspondingly be any type of computer equipment having applications that expose services through APIs and process API transaction requests received through APIs, such as Web API service calls, RESTful API transactions, etc., and may include, but are not limited to mainframe computers, application servers, desktop computers, laptop computers, tablet computers, and smart phones.

As illustrated in FIG. 1, operations of the API transaction risk assessment equipment 120 may reside in a plurality of policy enforcement points (PEPs) 122a-122y and a policy decision point (PDP) 124. One or more of the PEP's 122a-122y may be processed by a same computer host as the PDP 124, or may be processed on physically separate computer hosts that have different network addresses and communicate between them through one or more data networks 110a, 110b, etc. Accordingly, the PDP 124 may operate as a centralized policy decision point for the plurality of geographically dispersed and communicatively connected PEP's 122a-122y that control deliverability of API transaction request from any number of resource nodes (e.g. API clients 100) to any number of destination nodes (e.g. application servers 110). Although a single PDP 124 and two PEPs 122a-y are shown in FIG. 1, it is to be understand that any number of PDP 124 and PEP 122 may be used with various embodiments disclosed herein. Moreover, one or more of these embodiments may be implemented in any type of computer equipment and are not limited to use in a PDP and/or PEP.

The PEP(s) 122 can be responsible for generalized message processing of Web service and other API transaction requests. These requests can include SOAP messages using a variety of transport bindings including, but not limited to, HTTP(s), Message-Oriented Middleware (MOM) such as ActiveMQ, email, TCP sockets, (s)FTP(s), etc). API transaction requests following the RESTful architectural pattern can include HTTP(s) transport and message content types that include, but are not limited to, simple text, binary attachments, XML documents, JSON structures, etc. The PEP(s) 122 can also be responsible for application of rules (policy) to Web services or other API transaction requests. The rules can define an algorithm applied to an API transaction request in flight that has not yet been delivered to the destination node. The algorithm can control one or more of: authentication of credentials associated with the API transaction request; validation of content of the API transaction request; modification of content of the API transaction request; and routing of the API transaction request content to the destination node 110 and/or another node of the system and/or another system. Evaluation of these steps may occur locally for performance reasons; however, some steps may leverage additional external infrastructure elements such as directories, databases, or various PDPs such as described herein.

The PDP can be a rules engine that is optimized for risk evaluation. The rules can include rule sets that are compared (e.g., evaluated to determine if one or more is satisfied) to context information of the API transaction request to generate a risk assessment score. Rule sets that detect typical fraud patterns can be defined or developed by learning-based processes over time. In addition, rule sets can be customizable to detect emerging threats or to accommodate local needs.

Various potential advantages that may be obtained by separating operations of the PEP from operations of the PDP may include, but are not limited to: 1) enabling administrative separation of concerns between the administration of PDP risk-associated policy and rule sets and the administration of PEP message-in-flight handling policy (including remediation action(s) based on risk score); and/or 2) allowing a single PDP to serve many PEP instances which can provide favorable reuse efficiencies for enterprise systems having many API clients and/or many application servers.

Figure 2:
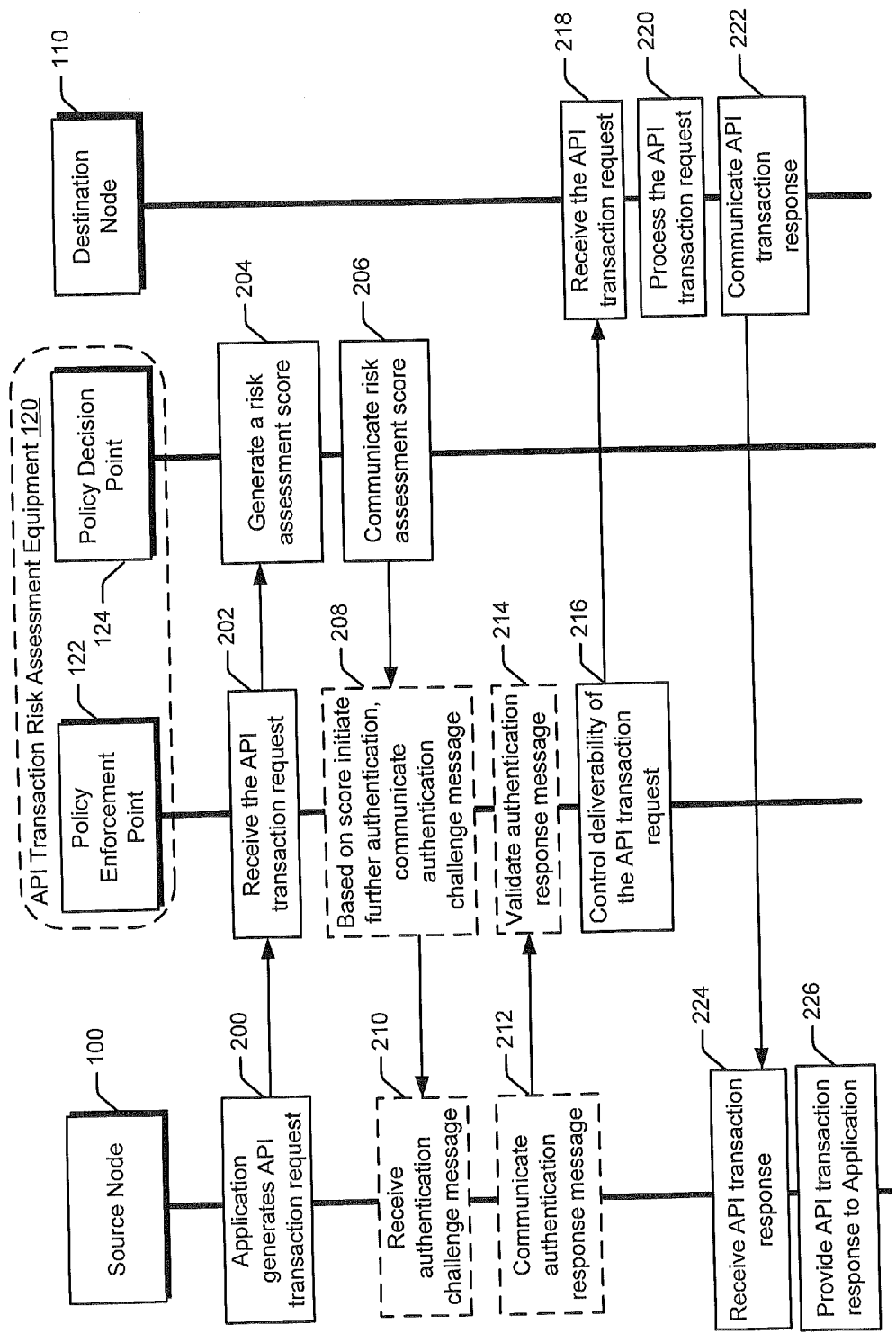
FIG. 2 is a flowchart of operations and information flows that may be performed by the system components of FIG. 1, in accordance with some embodiments.

FIG. 2 is a flowchart of operations and information flows that may occur between the system components of FIG. 1, in accordance with some embodiments. Referring to FIG. 2, an application processed by the source node 100 (e.g., API client) generates (block 200) an API transaction request that is communicated through a data network for processing by one or more applications on a destination node 110 (e.g., application servers). The PEP 122 receives (block 202) the API transaction request, and may be configured to intercept the API transaction request to prevent it from reaching the destination node 110 without the PEP 122 first authorizing its delivery to the destination node 110. The PEP 122 communicates the API transaction request (e.g., the entire API transaction request or information characterizing the API transaction) to the PDP 124.

The PDP 124 generates (block 204) a risk assessment score based on context information that characterizes the API transaction request (e.g., the context information may be received from the PEP 122 or may be generated by the PDP 124 based on one or more defined rules). The risk assessment score indicates a level of trustworthiness of the API transaction request for processing by an application on the destination node 110. The PDP 124 communicates (block 206) the risk assessment score to the PEP 122. The PEP 122 controls (block 216) deliverability of the API transaction request to the destination node 110 for processing based on the risk assessment score. API transaction requests that are deemed to have insufficient trustworthiness, based on the risk assessment score and a defined risk assessment rule, are not delivered to the destination node 110 in order to shield the destination node 110 from possible API based intrusion attacks and other malicious or undesirable operations that may occur if the API transaction requests were allowed to be processed by the destination node 110.

The PDP 124 may generate the risk assessment score based on a collection of context information that characterizes API transaction requests received by a plurality of the PEPs 122. The PDP 124 may generate the risk assessment score based on a trend over time determined from context information that characterizes API transaction requests received by a plurality of the policy enforcement points from the source node.

The PEP 122 controls (block 216) deliverability of the API transaction request to the destination node 110 for processing based on the risk assessment score. Depending upon the risk assessment score, the PEP 122 can deliver the API transaction request to the destination node 110 for receipt (block 218). The destination node 110 processes (block 220) the API transaction request to generate an API transaction response (e.g., by retrieving or generating information requested by the API transaction request), and communicates (block 222) the API transaction response to the source node 100. The source node 100 receives (block 224) the API transaction response, and provides (block 226) the API transaction response to the application on the source node 104 for processing.

The PEP 122 may, based on the risk assessment score (e.g. risk assessment score not satisfying a defined threshold value or other risk assessment rule), initiate further authentication through an authentication challenge process that attempts to authenticate the source node 100, the application that generated (block 200) the API transaction request, a person operating the source node 100, etc. The authentication challenge process includes communicating (block 208) an authentication challenge message to the source node 100. The source node 100, or application process thereon, receives (block 210) the authentication challenge message 210 and communicates (block 212) an authentication response message 212, which may contain identification information for the application that generated API transaction request and/or for the source node 100, and/or which may contain an authentication key or other authentication information (which may be based on one or more authentication processes and technologies known in the art). The PEP 122 validates (block 214) content of the authentication response message and can control (block 216) deliverability of API transaction request based on whether or not the authentication response message was properly validated. For example, when the PEP 122 determines that credentials received in the API transaction request are invalid or otherwise suspicious (e.g., based on a defined validation rule or other risk assessment rule), the PEP 122 may discard the API transaction request without delivering it to the source node 110.

The PEP 122 may apply API transaction request handling policies for access control that control whether or not the API transaction request is delivered to the destination node 110, and may also include per-message threat detection, message content transformation, rate limiting, and/or routing to one or more defined other nodes of the system for further analysis and/or deliverability decision-making. The policies can include performing call-outs to provide context information for one or more API transaction request to one or more PDPs 124 for generation of risk assessment score(s) used to control deliverability of API transaction request(s).

In another embodiment, instead of the PEP 122 controlling deliverability of the API request to the destination node 110 for processing based on the risk assessment score, the PEP 122 may instead forward the API request with the risk assessment score to the destination node 110. The destination node 110 can then perform policy decision making based on the risk assessment score to determine whether and/or how it will handle processing of the API request. If the risk assessment score does not satisfy a defined policy, the destination node 110 may, for example, reject the API request, initiate further authentication through an authentication challenge process that attempts to authenticate the source node 100, the application that generated (block 200) the API transaction request, a person operating the source node 100, etc.

The communication interface between the PEP 122 and the PDP 124 may be based on a request and response API. The PEP 122 may communicate (block 202) to the PDP 124 information that characterizes the originating network address (e.g., IP address) of the source node 100, an authenticated identifier of the application which generated the API transaction request or an unauthenticated identifier of the application, a unique device identifier for the source node 100 or an electronic device associated therewith, and/or one or more custom elements associated with the API transaction request, which may include transport meta data (e.g., query or post parameters, URL, HTTP headers, MOM-headers, etc), API transaction request content (e.g., a credit card number), and/or or operational state variables of the PEP 122. The operational state variables of the PEP 122 may include, for example, a current rate at which API transaction requests are being received for a particular API of the application of the destination node 110 and/or for other applications of the destination node 110; and/or a current rate at which API transaction requests are being received from a particular application of the source node 100 and/or from other applications of the source node 100 or other source nodes, etc.

Operations that the PEP 122 can perform to control deliverability of the API transaction request based on the risk assessment score can include any one or more of: 1) allowing the API transaction request by forwarding it to the destination node 110; 2) denying the API transaction request by discarding it to prevent its processing by an application of the destination node 110; 3) delaying delivery of the API transaction request; 4) controlling rate of a sequence of API transaction requests; 5) modifying content of the API transaction request; 6) perform a first/further authentication process; and 7) other operations described below. The PEP 122 may map different ranges of risk assessment scores to different operations that the PEP 122 can perform to control deliverability of the API transaction request, and can thereby use a risk assessment score received from the PDP 124 to select among the available operations to control deliverability of the associated API transaction request.

The mapping of different ranges of risk assessment scores to different available operations to control deliverability of the associated API transaction requests may be configured by an administrator based on the extent of undesirable consequences that can arise from processing of API transmission requests by the destination node 110. In one embodiment, an administrator can define policies that cause API transaction requests having a score greater than the first defined threshold (e.g., 50) to be discarded (e.g. blocked), cause API transaction requests having a score less than a second defined threshold (e.g., 20) to be allowed to pass through to the destination node 110 for processing, and cause API transaction requests having a score between the first and second defined thresholds to properly complete further authentication before being allowed to pass through to the destination node 110 for processing.

Figure 3:
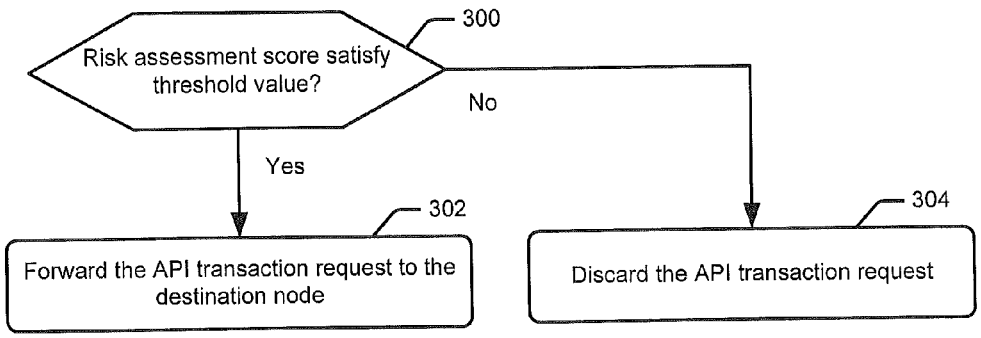
FIGS. 3-5 are flowcharts that illustrate operations that may be performed by one or more components of the API transaction risk assessment equipment of FIG. 1, in accordance with some embodiments.
Figure 4:
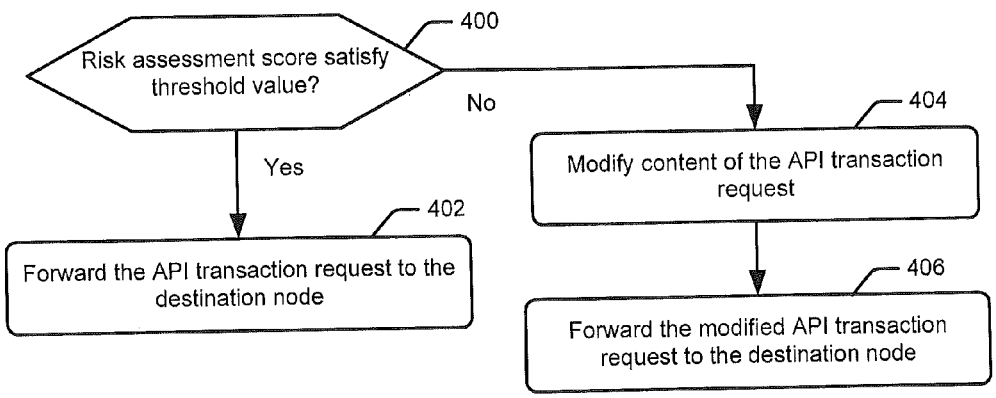
Figure 5:
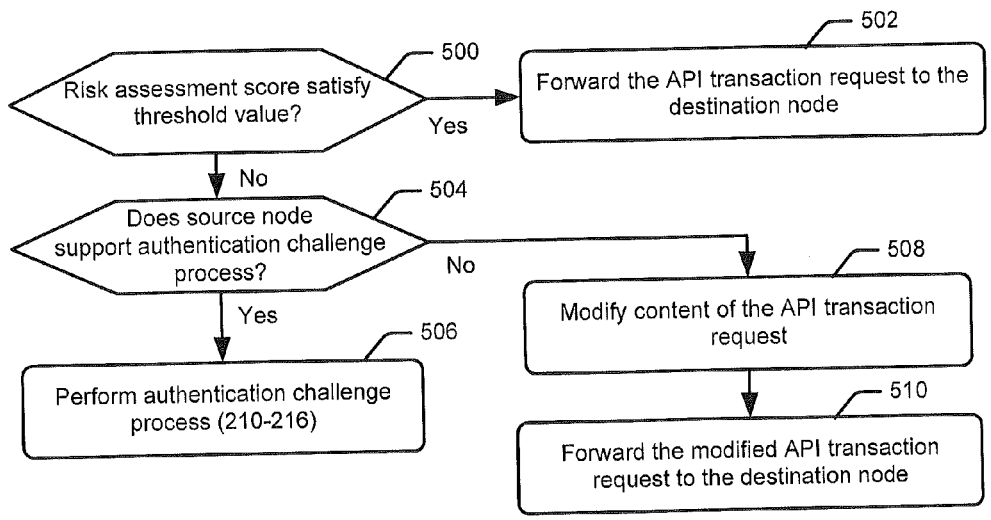

FIGS. 3-5 are flowcharts that illustrate operations that may be performed by the PEP 122 of FIG. 1 to control (block 216 of FIG. 2) deliverability of the API transaction request through a data network to the destination node 110 for processing based on determining (blocks 300, 400, 500) whether the risk assessment score satisfies a threshold value, in accordance with some embodiments.

Referring to FIG. 3, the PEP 122 forwards (block 302) the API transaction request to the destination node 110 based on the risk assessment score satisfying a threshold value. In contrast, the PEP 122 discards (block 304) the API transaction request to prevent its processing by the application of the destination node 110 based on the risk assessment score not satisfying the threshold value. A denial of service message may be communicated back to the source node 100 when an API transaction request is discarded, if the source node 100 supports such protocol flow control.

Referring to FIG. 4, the PEP 122 forwards (block 402) the API transaction request to the destination node 110 based on the risk assessment score satisfying a threshold value or other defined risk assessment rule. In contrast, the PEP 122 modifies (block 404) content of the API transaction request to generate a modified API transaction request based on the risk assessment score not satisfying the threshold value, and forwards (block 406) the modified API transaction request to the destination node 110. The PEP 122 may modify (block 404) content by modifying a variable contained in the modified API transaction request that constrains what type of information will be accessed by the modified API transaction request when processed by the application on the destination node 110.

An example would be if an API transaction request is querying a sensitive database. While some information may be provided at a normal rate, other information may be provided at a slower controlled rate to allow continued inspection of the risk of processing the API transaction request. If the continued inspection of the risk of processing the API transaction request results in a sufficiently untrustworthy risk assessment score, the PEP 122 can terminate any further providing of information from the destination node 110 to the source node 100. The risk engine may configure the PEP to modify an API request that is seeking 100 rows of information to instead provide access to only 20 rows of information if the API transaction request has a sufficiently untrustworthy risk assessment score.

The PEP 122 may selectively perform the authentication process of blocks 208 and 214 based on whether the source node 100 supports the authentication process. Referring to FIG. 5, when the risk assessment score is determined (block 500) to satisfy a threshold value, the PEP 122 can forward the API transaction request to the destination node 110 for processing. Otherwise, when the risk assessment score does not satisfy the threshold value, the PEP 122 can further determine (block 504) whether the source node 100 supports an authentication challenge process. When the authentication challenge process is supported, the PEP 122 and the source node 100 can perform the authentication challenge process of blocks 210-216 of FIG. 2. In contrast, when the authentication challenge process is not supported, the PEP 122 can modify (block 508) content of the API transaction request to generate a modified API transaction request, and forward (block 510) the modified API transaction request to the destination node 110. Instead of modifying content of the API transaction request, the PEP 122 may discard the API transaction request to prevent its processing by the application of the destination node 110.

The PDP 124 may operate with the PEP 122 to stop an API transaction request in-flight by having the PEP 122 intercept and hold an API transaction request until it receives the risk assessment score from the PDP 122 and determines therefrom how to control deliverability of the API transaction request to the destination node 110 for processing.

Alternatively, the PDP 124 may monitor API transaction requests without introducing delay (or substantial delay) as they are communicated through one or more networks for receipt by the destination node 110. The PDP 124 may analyze the API transaction requests to identify their untrustworthy characteristics (e.g., identify one or more trustworthiness rules that are satisfied or not satisfied by one or more API transaction requests) potentially after completion of their processing by the destination node 110, and may cause defined remedial actions to be performed to undo the result of an earlier processed API transaction request that has now been deemed sufficiently untrustworthy. Some operations of the PDP 124 may developed based on a web access software architecture provided by the RiskMinder™ product by CA Technologies, Inc.

The PDP 124 may generate a risk assessment score based on information regarding API transaction requests that are characterized or assessed by other PEPs or by other systems. The PDP 124 may make calls out to other databases to evaluate the API transaction requests. The PDP 124 therefore can be open-ended to include external sources of information as bases for generation of a risk assessment score. The PDP 124 may use information received from a plurality of PEP's when generating a risk assessment score, which may allow the PDP 124 to look for API transaction request patterns across the system for indications of fraudulent or other undesirable activity which in context should affect a risk assessment score for a API transaction request.

Referring further to FIG. 2, the PDP 124 can generate (block 204) the risk assessment score based on comparison of the context information characterizing the API transaction request to defined risk assessment rules, some nonlimiting examples of which are described herein. The PDP 124 may identify one of a plurality of known API transaction protocols that is being used by the API transaction request, and generate the risk assessment score based on whether the identified one of the plurality of known API transaction protocols that is being used by the API transaction request matches an API transaction protocol that is expected to be used by the application processed by the source node. For example, when an API transaction from a particular source node application is provided by a REST API instead of a Web services API or another transaction protocol that is expected to be received, the determination that an API transaction is being used can cause the PDP 124 to indicate a higher assessed risk by the generated risk assessment score.

The PDP 124 may generate the risk assessment score based on whether the source node has a network address that is within a list of known network addresses of source nodes that are known to be sources of untrustworthy API transaction requests and/or based on whether the source node has a network address that is within a list of known network addresses of source nodes that are known to be sources of trustworthy API transaction requests. The PDP 124 may determine a routing address pathway through the data network from the source node 100 to the PEP 122, and generating the risk assessment score based on whether the routing address pathway includes a network address that is within a list of known network addresses of anonymizing servers, such as virtual private network (VPN) proxy servers or aggregator nodes, or other nodes that are known to be associated with higher or lower level of trustworthiness for API transaction requests, and/or based on whether a network address of the source node cannot be determined from the routing address pathway. In this manner, particular source nodes and/or applications located in some defined geographic regions or having defined identifiers can be blacklisted. A list of source addresses that are known to be compromised, known originator of intrusion or other attacks, and/or associated with fraudulent requests can be developed over time or received from an administrator or system component. Conversely, a list of source addresses (e.g., IP addresses known to be associated with Amazon Web Services, etc.) that are known to be sources of trustworthy API transactions requests can be developed over time or received from an administrator or system component.

The PDP 124 may identify a characteristic of the application processed by the source node 100, and generate the risk assessment score based on whether content of a sequence of API transaction requests received from the application processed by the source node satisfies a rule that defines what content is acceptable to be received in a sequence of API transaction requests from an application having the characteristic. The PDP 124 may determine what type of information will be accessed by each of a sequence of API transaction requests received from the application when processed by the application on the destination node, and then generate the risk assessment score based on comparison of the type of information that will be accessed by each of the sequence of API transaction requests to acceptable types of information defined by the rule.

Thus, for example, the type of API transaction request and/or metadata or other content of the API transaction request, an observed sequence of API transactions, the timing of API transaction requests within a sequence of API transactions can be compared to expected/known information to generate the risk assessment score. The PDP 124 can keep track of sequence of API transactions from a same source node application, from a same source node, from a plurality of source nodes, etc., to generate improved assessments of trustworthiness.

Tracking such sequences may be useful to detect when people try to hack systems by relying upon the fact that the web is not statefull (e.g., each API transaction request contains all information needed to process that request without expect the destination node 110 to have retained state information from one or more related earlier API transaction requests). Such hackers can attempt to then deviate from a logical or expected sequence to, for example, obtain access to system resources and/or application information for which they are not authorized to access. The PDP 124 can thereby observe sequences and/or timing of API transaction requests and compare such observations to an expected sequence and/or timing of API transaction requests to determine whether it is a trustworthy (e.g., valid) sequence.

The PDP 124 may generate the risk assessment score based on comparison of a threshold value to a rate at which a sequence of API transaction requests are received from the application processed by the source node. For example, when the rate at which API transaction requests are received from the application on the source node 100 is below a defined threshold (e.g., indicative of the requests being generated by a human instead of by an application), the risk assessment score can be defined to indicate a low level of trustworthiness (i.e., untrustworthy). For example a source node that submits 1000 API transaction requests over a one minute duration can be confirmed as not being operated by a human being. The types of transactions that are expected to be received in a sequence over of requests over time may be compared to an incoming sequence. For example home banking transactions have an expected pattern over time, e.g., sequentially checking account balances in decreasing/increasing numerical account number order and/or types and/or orders of inquiries (account balance inquiries, deposits, withdrawals).

The PDP 124 may generate the risk assessment score based on the time of day and/or date of week when then API transaction request is received and a risk assessment rule that defines acceptable or expected timeframes and/or days when such requests are allowable. The rule may be defined by an administrator or learned over time by observing patterns and timing of requests.

The PDP 124 may identify a characteristic of the application processed by the source node, and generate the risk assessment score based on whether a time delay between receipt of each of a sequence of API transaction requests from the application processed by the source node 100 satisfies a rule that defines expected time delay between receipt of a corresponding sequence of API transaction requests from an application having the characteristic. For example, when a sequence of API transaction requests is expected to be received from the application processed by the source node 100 with a defined elapsed time therebetween, deviations from that the expected timing may cause the risk assessment score to indicate a low level of trustworthiness (i.e., untrustworthy) and, conversely not deviating from that the expected timing can cause the risk assessment score to indicate a high level of trustworthiness (i.e., trustworthy).

The risk assessment score may be generated based on a type of device (e.g., mobile phone) that generated the request, a particular type of application (e.g., an application on an iPhone versus an android phone) that generated the request, a type of device operating system, a type of network through which a request is communicated, a particular device ID of the source node 100, or any other characteristic of the source node 100 or intervening system components. The PEP 122 and/or the PDP 124 may perform a deep inspection of content of an API transaction request, and compare the content to expected types of variable/field values and ranges of variable/field values, and/or comparison between values of content variables/fields, and generate the risk assessment score based thereon. The PEP 122 and/or the PDP 124 may determine the type of application and/or device of the source node 100 (e.g., Apple IOS device, Android OS device, Windows OS device, Unix OS device, etc.), and may restrict deliverability and/or privileges of the API transaction request based thereon. For example, the PDP 124 may vary the risk assessment score to cause discarding of the API transaction request based on the API transaction request being received from an iPad device and/or based on a value of the request being outside an expected range.

The PDP 124 may identify a characteristic of the application processed by the source node, and generate the risk assessment score based on comparison of a threshold value to a rate at which API transaction requests are received from applications having the characteristics that are processed by a plurality of source nodes.

The PDP 124 may determine geographic locations associated with network addresses of the source node contained in a sequence of API transaction requests from the application processed by the source node 100. The risk assessment score can be generated based on whether the geographic locations change more than a threshold distance within a threshold time. For example, if the source node 100 is expected to be stationary or not have more than a threshold velocity, observing more than a threshold velocity can indicate a untrustworthiness of API transaction requests therefrom. Thus, receiving one request from a source node 100 located in a city in California followed by another request within a threshold elapsed time but appearing to be from the same source node 100 but now located in a city in Europe, may be an indication that the request is fraudulent and should be discarded or restricted (e.g., modified) according to one or more embodiments herein. A factor that may be considered when generating the risk assessment score is whether more than one application is associated with a shared account on the destination node 110.

The risk assessment score may be generated based on the geographic location of the source node 100, such as based on comparison of the geographic location to one or more defined geographic fence regions (e.g., countries banned under governmental law from business). The PDP 124 can also use external services to acquire deeper information about the API transaction requests. Services such as Neustar (formerly Quova) can provide authoritative geographic coordinates of an IP address (both fixed line and wireless using telco APIs). These can also supply centrally coordinated information about potentially threatening IP addresses based on prior attacks, as well as known proxy services that could be masking a true upstream IP.

The PDP 124 may assess each API transaction request separately (e.g., transaction-by-transaction) or may apply risk assessment rules to assess a sequence of transactions to identify trends or patterns that are indicative or trustworthiness. The PDP 124 can generate the risk assessment score based on a collection of context information that characterizes API transaction requests received by a plurality of the policy enforcement points. The PDP 124 can compare transactions, sequences, and/or trends from context information across API transaction requests received from a plurality of source nodes 100 and/or which is provided by a plurality of different PEPs 122. The PDP 124 can monitor and identify usage patterns for API transaction requests generated by, for example, a particular application on one of the API clients 100*a*-100*x*, a particular type of application on any of the API clients 100*a*-100*x*, the content or metadata of the API transaction requests for evaluation in risk analysis.

The PEP 122 can select and apply remediation actions to control deliverability of a presently received API transaction request and/or future received API transaction requests, and/or to remedy actions caused by processing performed by the destination node 110 and/or by the source node 100. The remediation actions may then be applied to change mapping between ranges of risk assessment scores and corresponding actions performed by the PEP 122 to control deliverability of API transaction requests. Such operations may help to reduce the potential of applications becoming compromised by malicious parties attempting to use limitations of application-to-application communication protocols (e.g., state less transaction protocols).

Operations for controlling deliverability of API transaction requests can include user privilege management. An API transaction request can be handled differently based on an authentication level determined for the source node 100 or an application processed by the source node 100 which generated the API transaction request, and/or based on identification of a user of the source node 100. Different source nodes 100/applications can have difference authentication levels. When a source node 100/application has properly performed a step up access control process, the source node 100/application can be granted a more trusted authentication level (e.g., a root account), and API transaction requests received from that source node 100/application can be handled using different deliverability control rules and/or different flow control. For example, the PEP 122 may, depending upon the authentication level of the source node 100/application, can either intercept and hold API transaction requests before selectively delivering to the destination node 110 or allow uncontrolled delivery to the destination node 110 with continuing assessment of risk associated with the API transaction requests. The authentication level of the source node 100/application may be adjusted over time based on comparison of the API transaction requests to risk assessment rules.

Content of the API transaction requests can be modified based on the authentication level of the source node 100/application. Different data can be thereby be provided by the destination node depending upon the authentication level of the source node 100/application. When operating at a root level, API transaction requests from the source node 100/application can cause the destination node 110 to provide a greater quantity of information, more sensitive information, etc. in API transaction responses. For example a root level API source node 100/application who is querying user accounts can be provided a larger set of data (full account details) then a non-root level API source node 100/application that may be provided only the account names and associated name of the persons. The amount of information and/or type of information that is returned responsive to an API transaction request can thereby be dynamically controlled by modification of content of the request based on the risk assessment score.

The PDP 124 can obtain risk assessment rules from a remote repository(ies) (e.g., a centralized repository used by a plurality of PDPs) and/or an internal repository, and may develop or modify risk assessment rules over time, such as based on feedback received from the PEP 122, the destination node 110 and/or the source node 100/application.

Figure 6:
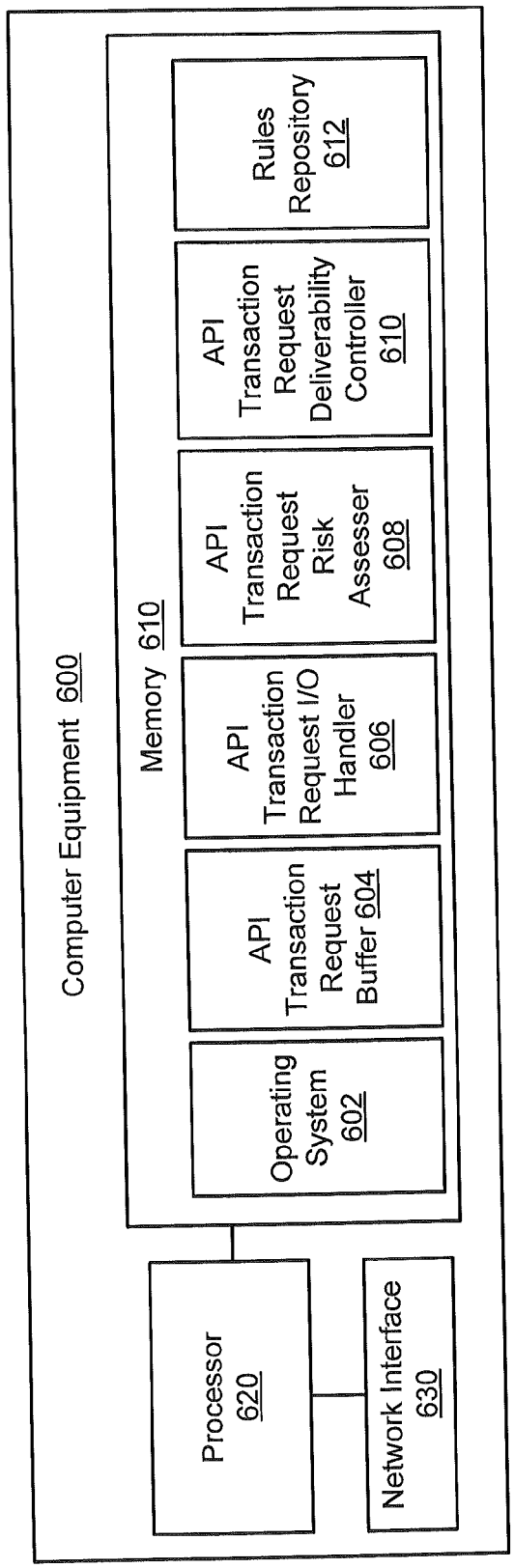
FIG. 6 is a block diagram of computer equipment that may be used as one or more components of the API transaction risk assessment equipment of FIG. 1, in accordance with some embodiments.

FIG. 6 is a block diagram of computer equipment 600 that may be used as the one or more components of the API transaction risk assessment equipment 120 of FIG. 1, in accordance with some embodiments. Referring to FIG. 6, the computer equipment 600 can include a network interface 630 which communicates via the one or more networks 110*a/b* other components of the equipment 120 (e.g., PEP 122, PDP 124, etc.), a processor 620, and a memory 610 that contains computer program instructions. The processor 620 may include one or more data processing circuits, such as a general purpose and/or special purpose processor (e.g., microprocessor and/or digital signal processor), which may be collocated or distributed across one or more data networks (e.g., networks 110a-b). The processor 620 is configured to execute computer program instructions from the memory 610, described below as a computer readable medium, to perform some or all of the operations and methods for one or more of the embodiments disclosed herein.

The software can include applications 606-610 and an operating system 602. The operating system 602 can manage operation of the computer equipment 600 and execution of the applications 606-610. An API transaction request buffer 604 can temporarily buffer API transaction requests received from source nodes until their deliverability is controlled. An API transaction request input/output (I/O) handler 606 can control receipt of API transaction requests, buffering of requests in the buffer 604, and delivery of requests to identified destination nodes or other network addresses. An API transaction request risk assessor 608 can generate the risk assessment scores based on one more risk assessment rules that reside in a rules repository 612. An API transaction request deliverability controller 610 can control deliverability of buffered API transaction requests based on risk assessment scores. The buffer 604, the handler 606, and the deliverability controller 610 may reside in a PEP 122. The risk assessor 608 and the rules repository 612 may reside in a PDP 124.

Further Definitions and Embodiments

As will be appreciated by one skilled in the art, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus, and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" or "/" includes any and all combinations of one or more of the associated listed items.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. An application programming interface (API) equipment comprising:
   a policy enforcement point (PEP) computer host; and
   a policy decision point (PDP) computer host communicatively connected to the PEP computer host through a data network,
   wherein the PEP computer host has a different network address on the data network than the PDP computer host;
   the PEP computer host comprising processor circuitry and a memory coupled to the processor circuitry of the PEP computer host and comprising computer readable program code that when executed by the processor circuitry of the PEP computer host causes the processor circuitry of the PEP computer host to perform operations comprising:
      receiving a first API request through the data network from an application processed by a source node;
      transmitting the first API request to the PDP computer host through the data network;
      receiving a first assessment score from the PDP computer host through the data network;
      determining that the first assessment score satisfies a threshold value;
      based on the first assessment score satisfying the threshold value, controlling deliverability of the first API request through the data network to the destination node for processing based on the first assessment score by transmitting the first API request through the data network to the destination node;
      receiving a second API request through the data network from the application processed by the source node;
      indicates a level of trustworthiness of the second API request for processing by the application on the destination node; and
      transmitting the second API request to the PDP computer host through the data network;
      receiving a second assessment score from the PDP computer host through the data network;
      determining that the second assessment score does not satisfy the threshold value;
      controlling deliverability of the second API request through the data network to the destination node for processing based on the second assessment score not satisfying the threshold value by modifying an amount of data that is requested by the second API request; and
      transmitting the modified second API request through the data network to the destination node; and
   the PDP computer host comprising processor circuitry and a memory coupled to the processor circuitry of the PDP computer host and comprising computer readable program code that when executed by the processor circuitry of the PDP computer host causes the processor circuitry of the PDP computer host to perform operations comprising:
      receiving the first API request from the PEP computer host through the data network;
      generating the first assessment score based on context information that characterizes the first API request, wherein the first assessment score indicates a level of trustworthiness of the first API request for processing by the application on the destination node, and transmitting the first assessment score to the PEP computer host through the data network;
      receiving the second API request from the PEP computer host through the data network; and
      generating the second assessment score based on context information that characterizes the second API request, wherein the second assessment score indicates a level of trustworthiness of the second API request for processing by the application on the destination node, and transmitting the second assessment score to the PEP computer host through the data network.

2. The API equipment of claim 1, wherein the computer readable program code, when executed by the processor circuitry of the PEP computer host, causes the processor circuitry of the PEP computer host to perform operations further comprising:
   storing in a buffer memory a sequence of API requests received from the application processed by the source node; and
   receiving a series of assessment scores generated by the PDP computer host based on context information that characterizes the sequence of API requests, wherein the series of assessment scores indicate levels of trustworthiness of the sequence of API requests for processing by the application on the destination node; and increasing a time delay between the storing of individual ones of the sequence of API requests in the buffer memory and transmitting of the individual ones of the sequence of API requests from the buffer memory to the destination node based on the assessment scores not satisfying a threshold value.

3. The API equipment of claim 1, wherein controlling deliverability of the second API request to the destination node for processing based on the second assessment score, comprises:

determining whether the source node supports an authentication challenge process, in response to the second assessment score not satisfying the threshold value; and based on determining that the source node does not support the authentication challenge process and the second assessment score not satisfying the threshold value, performing the modifying the amount of data that is requested by the second API request, and transmitting the modified second API request to the destination node.

4. The API equipment of claim 1, wherein generating the first and second assessment scores based on the context information that characterizes the first and second API requests, respectively, comprises:

identifying one of a plurality of known API protocols that is being used by the respective API request; and generating the respective assessment score based on whether the identified one of the plurality of known API protocols that is being used by the respective API request matches an API protocol that is expected to be used by the application processed by the source node.

5. The API equipment of claim 1, wherein generating the first and second assessment scores based on the context information that characterizes the first and second API requests, respectively, comprises:

generating the respective assessment score based on whether the source node has a network address that is within a list of known network addresses of source nodes that are known to be sources of untrustworthy API requests and/or based on whether the source node has a network address that is within a list of known network addresses of source nodes that are known to be sources of trustworthy API requests.

6. The API equipment of claim 1, wherein generating the first and second assessment scores based on the context information that characterizes the first and second API requests, respectively, comprises:

determining a routing address pathway through the data network from the source node to the API equipment; and generating the respective assessment score based on whether the routing address pathway includes a network address that is within a list of known network addresses of anonymizing servers and/or based on whether a network address of the source node cannot be determined from the routing address pathway.

7. The API equipment of claim 1, wherein generating the first and second assessment scores based on the context information that characterizes the first and second API requests, respectively, comprises:

identifying a characteristic of the application processed by the source node; and generating the respective assessment score based on whether content of a sequence of API requests received from the application processed by the source node satisfies a rule that defines what content is acceptable to be received in a sequence of API requests from an application having the characteristic.

8. The API equipment of claim 7, wherein generating the first and second assessment scores based on whether content of the sequence of API requests received from the application processed by the source node satisfies the rule that defines what content is acceptable to be received in the sequence of API requests from the application having the characteristic, comprises:

determining what type of information will be accessed by each of a sequence of API requests received from the application when processed by the application on the destination node; and generating the respective assessment score based on comparison of the type of information that will be accessed by each of the sequence of API requests to acceptable types of information defined by the rule.

9. The API equipment of claim 1, wherein generating the first and second assessment scores based on the context information that characterizes the first and second API requests, respectively, comprises:

generating the respective assessment score based on comparison of a threshold value to a rate at which a sequence of API requests are received from the application processed by the source node.

10. The API equipment of claim 1, wherein generating the first and second assessment scores based on the context information that characterizes the first and second API requests, respectively, comprises:

identifying a characteristic of the application processed by the source node; and generating the respective assessment score based on whether a time delay between receipt of each of a sequence of API requests from the application processed by the source node satisfies a rule that defines expected time delay between receipt of a corresponding sequence of API requests from an application having the characteristic.

11. The API equipment of claim 1, wherein generating the first and second assessment scores based on the context information that characterizes the first and second API requests, respectively, comprises:

identifying a characteristic of the application processed by the source node; and generating the respective assessment score based on comparison of a threshold value to a rate at which API requests are received from applications having the characteristics that are processed by a plurality of source nodes.

12. The API equipment of claim 1, wherein generating the first and second assessment scores based on the context information that characterizes the first and second API requests, respectively, comprises:

determining geographic locations associated with network addresses of the source node contained in a sequence of API requests from the application processed by the source node; and generating the respective assessment score based on whether the geographic locations change more than a threshold distance within a threshold time.

13. The API equipment of claim 1, wherein:

the memory located in the PDP computer host comprises computer readable program code that when executed by the processor circuitry located in the PDP computer host causes the processor circuitry located in the PDP computer host to generate the first and second assessment scores based on a collection of context information that characterizes API requests received by a plurality of the PEP computer hosts.

14. The API equipment of claim 13, wherein:
the memory circuit located in the PDP computer host comprises computer readable program code that when executed by the processor located in the PDP computer host causes the processor located in the PDP computer host to generate the first and second assessment scores based on a trend over time determined from context information that characterizes API requests received by a plurality of the PEP computer hosts from the source node.

15. The API equipment of claim 1, wherein the computer readable program code in the memory of the PEP computer host, when executed by the processor circuitry of the PEP computer host, causes the processor circuitry of the PEP computer host to perform operations further comprising:
   determining an authentication level of the application processed by the source node; and
   responsive to the authentication level being a root level, modifying the second API request to cause the destination node to provide a larger set of data in an API response to the second API request than when the authentication level is a non-root level.

16. The API equipment of claim 1, wherein modifying the amount of data that is requested by the second API request comprises reducing an amount of data that is requested by the second API request from the destination node based on the second assessment score not satisfying the threshold value.

* * * * *